Oct. 28, 1969    W. E. HUMPHREY    3,475,073
ACCIDENTAL-MOTION COMPENSATION BY TRIPLE REFLECTION
Filed Nov. 7, 1966    2 Sheets-Sheet 1

INVENTOR.
WILLIAM E. HUMPHREY
BY
Lippincott, Ralph & Hendrixon
ATTORNEYS

Oct. 28, 1969   W. E. HUMPHREY   3,475,073
ACCIDENTAL-MOTION COMPENSATION BY TRIPLE REFLECTION
Filed Nov. 7, 1966   2 Sheets-Sheet 2

INVENTOR.
WILLIAM E. HUMPHREY
BY
Lippincott, Ralls & Hendrickson
ATTORNEYS

United States Patent Office 3,475,073
Patented Oct. 28, 1969

3,475,073
ACCIDENTAL-MOTION COMPENSATION BY
TRIPLE REFLECTION
William E. Humphrey, Berkeley, Calif., assignor to Optical
Research and Development Corporation, Oakland,
Calif., a corporation of California
Filed Nov. 7, 1966, Ser. No. 592,369
Int. Cl. G02b 27/30
U.S. Cl. 350—16                             1 Claim

ABSTRACT OF THE DISCLOSURE

An optical stabilizer including an objective lens for focusing received light, a plane for displaying the focused image of the received light, and a triple reflection compensator for displacing and retrodirecting the focusing light therebetween. The triple reflecting compensator has three reflecting surfaces disposed to reflect light in a manner corresponding to a single plane mirror at an effective mirroring plane with a displacement between the intercepted and reflected light beams. This compensator is gimbal mounted and placed a distance substantially halfway along the focal path.

---

The present invention relates in general to the stabilization of optical systems against small-angle deviations thereof from a desired line-of-sight; and it is more particularly directed to accidental-motion compensation for any and all types of optical systems through the utilization of an inertially stabilized triple-reflection element providing the equivalent of a plane mirror surface with displacement of incident and reflected light.

There has been developed a variety of optical compensation methods and apparatus primarily directed to levelling instruments and generally operable only with regard to a vertical plane. While certain of these prior art advances have proven highly advantageous, they are generally inapplicable to the generalized field of optics. In addition to the foregoing, there have also been developed certain stabilization systems for accidental-motion compensation, as, for example, refractive systems, wherein one portion of a lens system is stabilized with regard to a line-of-sight so that motion of other portions establishes a corrective prism to remove error angles. Additional alternative approaches to the problem of accidental-motion compensation in the field of viewing devices and cameras, for example, include electronic or electrical compensation wherein light is represented by electron beams that are deflected to compensate for accidental motion, as well as electromechanical servo systems, in which misalignments are sensed and corrective forces applied.

The present invention has much the same objects as various prior art accidental-motion compensators, i.e., to provide a stabilized image plane in optical devices, such that small-angle variations from an original line-of-sight do not substantially move an image focused upon such plane. In this respect, reference is made to my copending patent application, Ser. No. 575,624, filed in the U.S. Patent Office on Aug. 29, 1966, for "Optical Stabilization by Reflecting Means." The present invention provides a stabilization system which may be termed a deflection type, wherein a compensating motion of the image is produced by deflecting the rays through a small angle at some point between the objective and image plane with a resultant slight tilting of the stabilized image, as contrasted to so-called displacement systems of the above-identified application wherein a very small shift along a direction normal to the image plane occurs. In both cases the image movement is extremely small, so that for substantially all practical purposes there is produced a true image stabilization.

The invention described below generally provides for the inertial stabilization of at triple reflective element in a surrounding light-tight case, so as to maintain the angular orientation of such element relative to a line-of-sight despite small angular deviations of the surrounding case. The reflecting element of the present invention is mounted to remain in line-of-sight position, and is stabilized against "pitch" and "yaw," but not necessarily against "roll" about an optic axis. In the following description the terms "angular orientation" and "angular deflection" are taken to refer to angles with respect to the axis of an original line-of-sight, and do not refer to rotations about such axis. It is to be further noted that the present invention is adapted to be embodied either in one or more prisms having three reflective surfaces or three particularly oriented mirrors, or the like, which provide the substantial optic equivalent thereof.

The invention is illustrated in the accompanying drawings wherein.

Figure 1:
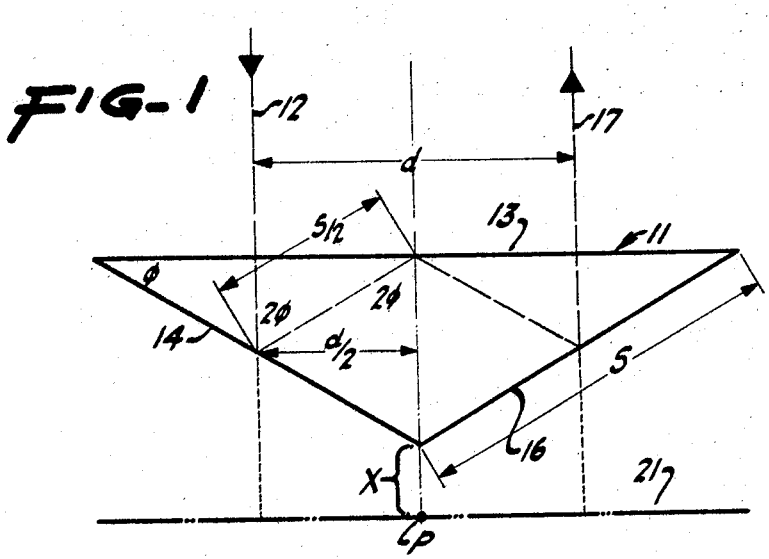
FIGURE 1 is a diagram illustrating light-reflecting properties of a first example of the compensator of this invention.

The present invention may be best understood by first considering one specific example and the geometry thereof, as illustrated in FIGURE 1 of the drawings. There is shown in FIGURE 1 a prism 11 having the shape of an isosceles triangle with corner angles $\theta$ equal to 30° for this example. For convenience of terminology, the prism 11 is hereinafter denominated as a "compensator," as a more generic term properly covering alternative embodiments such as those later described herein. In actuality, the compensator need not take the physical form of a prism, but may instead be comprised of an appropriate combination of reflecting surfaces, such as plane mirrors. In this particular example illustrated in FIGURE 1, light rays are illustrated as entering the compensator along an axis 12 perpendicular to a flat front surface 13 thereof, and travelling to one of a pair of rear reflecting surfaces 14 and 16. The light is reflected back to the other rear surface 16, and from there reflected from this rear surface 14 back to the front surface 13 whence it is again reflected back to the other rear surface 16, and from there reflected back out of the prism along an axis 17 which is shown to be parallel to the entering axis 12. Entering and exiting light ray axes are displaced a distance $d$. Considering further the geometry of this particular arrangement and denominating the length of each rear surface 14 and 16 as S, it will be apparent that light is reflected from the surface 14 at an angle $2\theta$ to the light striking such surface. The reflected light in this geometry travels a distance $S/2$ to impinge upon and be reflected from the front surface 13 at a point displaced $d/2$ from the entering axis 12. From this geometry there may then be derived the straightforward geometric relationship $\sin 2\theta = d/S$. Further to the general geometry of this arrangement, the path length of light in the prism may be determined by adding together the four separate portions thereof as indicated in FIGURE 1 as follows: $S/2 \sin \theta + S/2 + S/2 + S/2 \sin \theta$. This reduces to path length $l = S(1 + \sin \theta)$.

Consideration of this particular arrangement shows that light rays travelling in the material of the prism appear to enter along the line 12 and to leave along another line 17, as if they had been reflected from a plane mirror, but translated by a distance $d$. For rays travelling in the glass, or other material of the prism, these two planes may be considered to be coplanar and located a distance $S/2$ $(1 - \sin \theta)$ behind the vertex of the prism. This relationship may be derived from further consideration of the geometry of the arrangement and substraction of the distance between the vertex of the prism and the front surface 13, from the total distance between the front surface 13 and this effective mirror plane 21. Although the foregoing discussion dealt only with a light ray along the optic axis and displaced $d/2$ from the pivot P, the fact that the system acts like a plane mirror with translation means that other rays are likewise affected. Refractive effects will change the apparent position of this effective mirroring surface slightly; however, in the interests of simplicity in this example, each of the reflective surfaces 13, 14 and 16 are hereinafter considered as merely reflecting surfaces, or mirrors, so as to avoid the complications of refractive effects. In actuality, it is quite practical to build a system embodying the present invention utilizing mirrors rather than a prism wherein the front mirror has the width less than $d$ to block only a limited portion of the rear reflective surfaces near the apex thereof.

Figure 2:
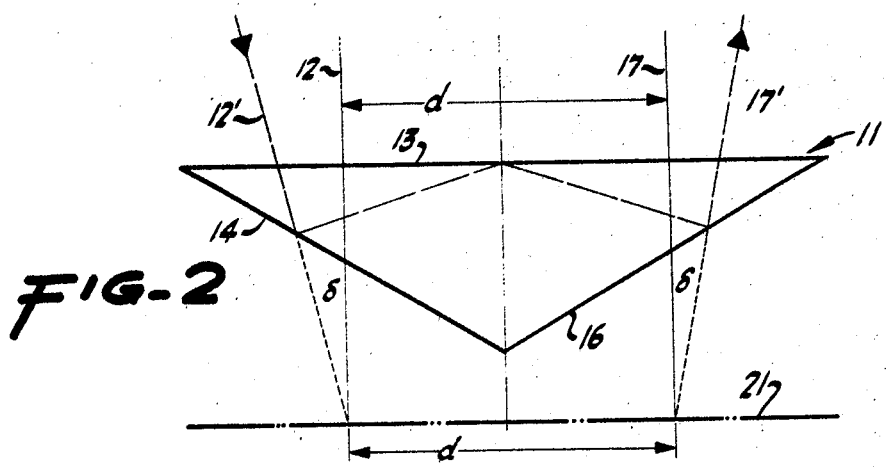
FIGURE 2 is a diagram illustrating light reflection relationships for an altered angle of incidence in the example of FIGURE 1.

Following the foregoing general discussion of one example of the system of the present invention, it is possible to consider the effects of variations in the angle of incident light upon the compensator. The purpose of these considerations will become more apparent from the following description of practical embodiments of the present invention. There is illustrated in FIGURE 2 a compensator 11 which may be identical to that illustrated in FIGURE 1; and there is shown by the light lines 12 and 17 the central light ray or optic axis of entering and emerging light as in FIGURE 1. There is also illustrated an optic axis 12' inclined at some angle other than 90° with respect to the front face of the compensator. A light ray entering the compensator along the line, or axis, 12' will be reflected from the rear surface 14 to the front surface 13 and thence back to the other rear surface 16 and out of the compensator along the line 17' as illustrated. The incident ray 12' is shown to enter the compensator at an angle $\delta$ with respect to perpendicular, and it will be seen that it leaves the compensator at an opposite angle $\delta$ to perpendicular, as would be expected from a plane-reflecting surface. Thus the angle of incidence equals the angle of emergence from the compensator, as would be the case if the compensator were a plane located at the plane 21. Likewise, for this ray 12' there is produced a displacement $d$ along the effective mirroring plane 21 just as in the case where the light ray entered perpendicularly to the compensator. The foregoing also holds true for varying points of incidence of the incoming ray along the surface of the compensator within the acceptance of the entrance and exit apertures thereof. Thus it will be seen that the compensator described above may be optically considered as a plane mirror with a predetermined translation between incident and reflected rays. These properties are of particular importance insofar as accidental-motion compensation is concerned, for lateral movement of the compensator relative to incident light rays, within acceptable limits, does not effect the angle of reflection of the displacement of incoming and outgoing light rays. It is to be further noted that in common with the plane-reflecting surface, the compensator of the present invention provides an angle of $2\delta$ between incident and reflected light rays wherein $\delta$ is the angle of incidence with respect to a perpendicular to the front surface of the compensator.

There has been discussed above certain geometrical relationships between elements of a simplified reflective unit, or compensator, and consideration given to the effect varying the angle of incident light, as may, for example, be produced by rotation of such a compensator. In the foregoing discussion of FIGURE 2 it could be assumed to be rotated about point P; however, it is herein noted that it is also possible to rotate the compensator about pivots at other places in the plane of symetry of the compensator, inasmuch as this merely translates the mirror system which is not sensitive to translation inasmuch as it behaves as a plane mirror. More generally, the compensator may be pivoted about axes lying on a line midway between incident and emergent light axes, and yet retain the characteristics set forth above. It is noted that there results a variation in path length with rotation of the system about pivot points a varying positions.

It is possible with a reflective system of the type described above to achieve image stabilization of the type required for accidental-motion compensation, either with cameras or optical-viewing devices. In this respect it is particularly noted that for camera applications, accidental-motion compensators should maintain an image from the objective substantially stationary or in a fixed position on a film plane. In this way small accidental movements or vibrations of a camera housing to which the objective and film plane are secured will be properly compensated, so that a stabilized image is presented to the film at the coincident stabilized image plane and film plane. On the other hand, optical-viewing devices such as telescopes and binoculars require a modified stabilization, so that light rays leaving the device are parallel to incoming light rays of the objective and will, thus, not move about with device vibrations. A full explanation of this difference in stabilization is set forth in my copending patent application Ser. No. 575,624, filed in the U.S. Patent Office on Sept. 1, 1966, and entitled "Optical Stabilization by Reflecting Means." Reference is made to such above-identified patent application for a complete discussion of this point; however, it is briefly noted herein that camera stabilization, or one-hundred-percent stabilization, as it is sometimes termed, is to be modified by the factor $$\left(1 \pm \frac{1}{M}\right)$$

for optical-viewing devices wherein M is the magnification of the optical system. The fraction of "camera stabilization" required for erecting telescopes is $$\left(1 - \frac{1}{M}\right)$$

and for inverting telescopes the fraction of "camera stabilization" is $$\left(1 + \frac{1}{M}\right)$$

In the following discussion of the present invention reference is generally made to camera stabilization; and it is to be understood that such is to be modified by the foregoing factor for optical-viewing devices, such as binoculars, telescopes and the like.

Figure 3:
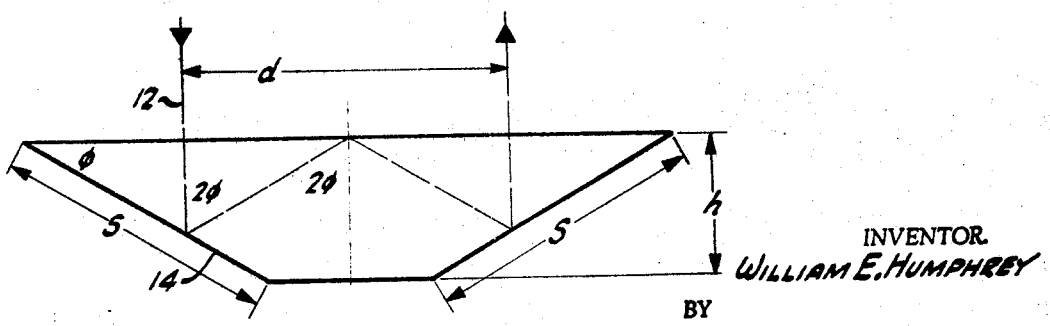
FIGURE 3 is a diagram of a second example of the invention for illustrating certain variations in physical relationships.

It will be appreciated that the example described above employs three reflective surfaces identified in the drawings as 13, 14 and 16. Although these surfaces must have certain relationships with respect to each other, as described in more detail below, it is normally not necessary for the surfaces to have the physical extent illustrated in the foregoing example. Thus, a second example of the present invention, reference is made to FIGURE 3 wherein the rear point of the prism compensator is removed. In this instance, and employing the same conventions wherein $d$ is a separation of the incoming and outgoing axes, $\theta$ is the corner angle of the prism and $S$ is the length of the backsides of the prism, there results a somewhat different relationship from that derived above. Assuming that the incoming axis 12 strikes the rear surface 14 at a point one-half the distance between the front and rear surfaces of the prism, separated by a distance $h$, then it is possible by straightforward trigonometric calculation to derive the relationship that $h = S \sin \theta$, and that $$d = \frac{S \sin \theta \sin 2\theta}{\cos 2\theta}$$

which may be reduced to $d = S \sin \theta \tan 2\theta$. In this particular example illustrated in FIGURE 3, the total path length light in the prism is $$L = (S \sin \theta)\left(1 + \frac{1}{\cos 2\theta}\right)$$

and also the deflection plane 21 is displaced from the prism surface by $$\tfrac{1}{2}(S \sin \theta)\left(1 + \frac{1}{\cos 2\theta}\right)$$

In the foregoing discussion of a generalized triple-reflection system, the position of the reflecting surfaces was defined in terms of an angle $\theta$ and a distance $S$. It is particularly noted that certain limitations exist upon the angle $\theta$. It is believed apparent, upon careful consideration of the invention, that the incoming light must not strike the first reflecting surface 14 at such a large angle of incidence that it will not be reflected back to the second reflecting surface 13. Consequently the angle $\theta$ cannot be too large. Additionally, it is noted that the incoming light should not strike the first reflecting surface 14 at too small an angle of incidence, for otherwise it will be reflected almost directly back, and the translation $d$ will become too small for practical purposes. In practice, it has been found that the angle $\theta$, between the first and second reflecting surfaces, and, thus, also between the second and third reflecting surfaces, should be in the range of 15° to 45°. For an angle greater than 45°, the light rays tend not to reflect back to the second reflecting surface; and, on the other hand, for an angle $\theta$ less than 15°, the returning light rays are unduly close to the incident light rays for most practical applications. It is actually desired that a very substantial displacement of incident and reflected light rays occur, so that no interference exist therebetween and appropriate space be provided for utilization of the reflected light. Thus, for this embodiment of the present invention, the compensator, whether constructed as a prism or as three mirrors, should have the angle between the first and second reflecting surfaces in the range of 15° to 45°.

In addition to the above-described limitation upon the angle $\theta$ in the triple-reflection system hereof, it is particularly noted that the reflecting planes 13 and 14 and 16 are to be so oriented that each contains a line parallel to a line in the other plane. This may be alternatively stated that each of the reflecting planes has a line normal thereto which is perpendicular to a single line. In the plane of the drawings of FIGURES 1 and 3, for example, this is clearly shown wherein each of the planes may be considered to be vertical. In addition to the foregoing limitation, it is also required that the reflecting planes be so oriented that the original axis of entering light 12 is parallel to the axis of exiting light 17. The physical relationship of individual reflecting planes of the invention remains fixed, and any and all movement of the compensator moves these reflecting planes together. It is also particularly noted that the reflecting surfaces 13, 14 and 16 may be comprised of plane mirrors, for example, disposed in fixed relationship to each other. Under these circumstances the front reflecting surface 13 must have a limited lateral extent, so as to not interfer with entering and emerging light. For example, the front surface 13 may comprise a mirror having a lateral extent equal to or slightly greater than that of the rear surface of the prism illustrated in FIGURE 3, in which case the full reflecting properties of the front surface remain available for utilization for the second reflection of the light in the compensator.

Figure 4:
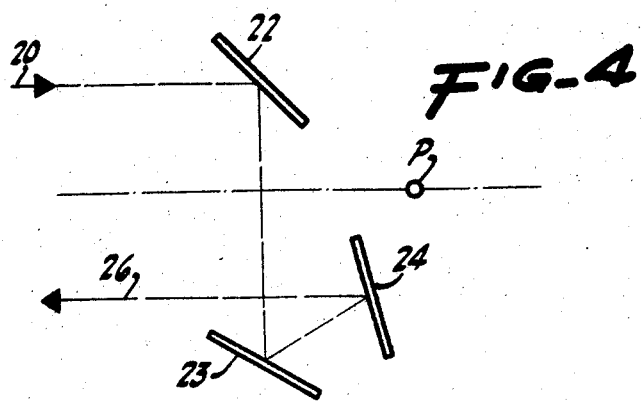
FIGURE 4 is a schematic illustration of one triple-mirror configuration of the compensator of this invention.

Following the limitations set forth in the preceding paragraph, it will be appreciated that certain alternative configurations of the present invention are possible, and are, in fact, quite practical. In this respect reference is made to FIGURE 4 of the drawings. In the embodiment of the invention, schematically illustrated in FIGURE 4, light entering along an optic axis strikes a first plane mirror 22, and is reflected therefrom to a second plane mirror 23. This second mirror 23 reflects the light onto a third plane mirror 24 which, in turn, reflects the light along an outgoing optic axis 26 which is parallel to the incoming axis 20. The individual mirrors 22, 23 and 24 are disposed so that each has a line on the surface thereof which is parallel to a line on the others; and it may, for example, be assumed in FIGURE 4 that the individual mirrors are vertically disposed to comply with this condition. Insofar as the relative angles between the surfaces of the mirrors are concerned, same are herein adjusted so that the emergent optical axis 26 is parallel to the entering optical axis 20. It will be appreciated that this allows a substantial degree of freedom in the relative positioning of the three reflecting surfaces. It is, however, particularly noted that the mirrors are disposed in fixed relationship to each other, so that their relative orientation remains the same, despite the fact that the entire unit comprised of the mirrors may actually be moved during usage of the invention.

In operation, the three reflecting surfaces are rigidly fixed together, and are then inertially stabilized with respect to a line-of-sight, i.e., the entering optic axis 20; however, for the majority of applications, it is not necessary for the compensator to be stabilized against rotations about such optic axis. Stabilization of this particular embodiment of the present invention is accomplished about a pivot point P located along a line midway between the optic axes 20 and 26.

Figure 5:
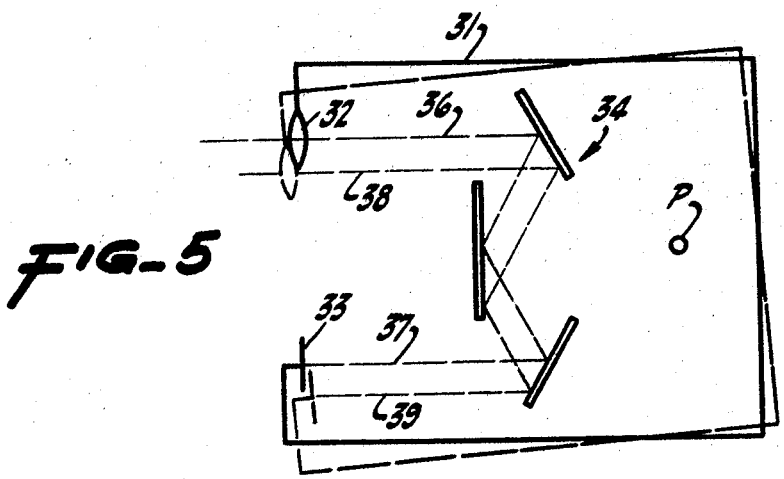
FIGURE 5 is a diagram illustrating the effects of small angular deviations of a simple optic system incorporating the invention.

Further to a complete understanding of the present invention, reference is made to FIGURE 5, illustrating schematically the effect of tilting of a camera housing, for example, containing the present invention. Considering a housing 31 having an objective lens system 32 and film plane 33, let it be assumed that there is disposed within the housing an inertially stabilized compensator 34, such as illustrated. This compensator is herein shown to comprise three plane mirrors disposed in the relationship set forth above, and fixed together. The compensator 34 is pivotally mounted about a point P, and is inertially stabilized about mutually perpendicular axes through such point, so as to maintain original angular orientation with respect to line-of-sight of the camera. There is illustrated in FIGURE 5 an optic axis, or central light ray, 36 from the objective 32, and the dashed line continuing this axis indicates the path of reflected light through the compensator 34, and thence along the emergent optic axis 37 to the film plane 33. A slight tilting of the camera housing 31, as may occur, for example, by inadvertent vibrations or jarring of a handheld instrument, is schematically illustrated by the dashed housing outline. In this example, for the purposes of explanation, it is assumed that the housing is rotated about the point P, so as to thus slightly displace the objective and film plane to the positions illustrated. In this slightly rotated position light then travels generally along an optic axis 38 from the displaced objective to strike the first mirror of the compensator at a different point than before; and it will be seen that such light is then reflected twice in the compensator to emerge along an optic axis 39 that is displaced from the original emergent optic axis 37, but which reaches the rotated film plane at the same position as it originally reached the unrotated film plane. Consequently, insofar as the film plane is concerned, no movement of the housing has occurred, and an image focused on the film plane is thus stabilized thereon, despite accidental minor angular deviations or motions of the housing. It will, of course, be appreciated that the total light path length from the objective to the film plane is equal to the focal length of the objective lens system, in order that a sharp image will actually be focused at the film plane. This point, together with others of general optical considerations common to all types of optic instruments, is not extensively discussed herein, for it is assumed that those practicing the present invention are skilled in the general art of optics. It is, of course, to be appreciated that no attempt is made in the foregoing illustration or description to actually depict the path of all light rays, for they are generally converging from the objective to the film plane; and there has only been illustrated a central light ray, for example, which is herein denominated as an optic axis. Again, in the interests of simplicity, the foregoing discussion has not fully covered the inertial stabilization of the compensator; however, this is discussed in some detail below in connection with the embodiment of the invention illustrated in FIGURE 6.

Figure 6:
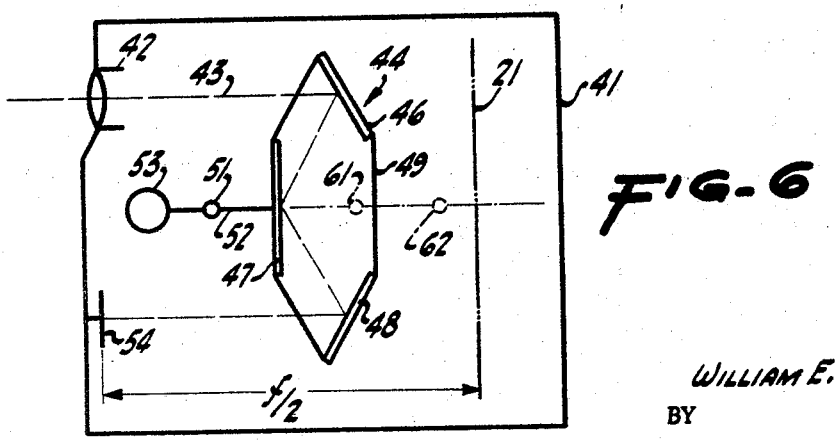
FIGURE 6 is a diagrammatic illustration of one possible embodiment of the invention.

Reference is now made to FIGURE 6 of the drawing which schematically illustrates in a line diagram an optical device embodying the present invention in the form of mirror reflecting surfaces. There is shown in FIGURE 6 a light-tight case, or housing, 41 mounting an objective lens system 42 at the front thereof, and directing light along an optic axis 43 to a triple-reflection compensator 44 in accordance with the present invention. This compensator includes three plane reflecting surfaces illustrated as mirrors 46, 47 and 48 with the mirror 46 disposed in line with the optic axis 43 from the objective, so as to reflect light to the second mirror 47 from whence it is reflected back to the third mirror 48, and thence reflected back along a new optic axis parallel to the optic axis 43 and displaced therefrom. The mirrors 46 to 48 of the compensators are connected together, as by struts, or the like, 49, appropriately disposed out of the possible light paths, but joining these mirrors together to form a single unit. The mirrors are substantially frictionlessly mounted about a pivot point located, for example, at 51 providing two mutually perpendicular degrees of freedom of motion; and this may be accomplished by an arm 52 extending from the backside of the mirror 47 through an appropriate gimbal mounting at 51. Inertial stabilization of the mirrors with regard to the original line-of-sight may be accomplished by the provision of a counterweight 53 on the end of the arm 52 beyond the pivot 51, so as to balance the mirrors and counterweight about this pivot point. It is again noted that the pivot 51 comprises a pivot axis perpendicular to the plane of the figure and one lying in the plane of the figure. Light reflected from the compensator 44 is focused at a stabilized image plane 54, shown in this case to be fixed to the housing 41 interiorly thereof, and in this embodiment to be aligned with the objective 42.

The mirrors 46 and 47 of the compensator are disposed at an angle $\theta$ to each other; and, likewise, the mirrors 48 and 47 are disposed at this same angle $\theta$ with respect to each other. As set forth above, the angle $\theta$ may have any desired value between 30° and 45° as practical limitations. The central mirror 47 has a limited lateral extent in the plane of the figure, so as to provide no interference to light directed from the objective onto mirror 46, or light reflected from mirror 48 to the stabilized image plane 54. This lateral displacement of incoming and reflected light from the compensator provides adequate spacing for locating of this central mirror 47 without interference. As discussed above in connection with FIGURES 1 and 2 of the drawing, the light directed from the objective 42 toward the compensator is reflected as though it were being reflected from a plane mirror located at 21, but translated laterally. With the described mounting of the compensator, it will be seen that the mirrors thereof remain in fixed angular orientation to the original line-of-sight, or optic axis, despite small vibrations, or the like, of the housing 41. Thus, a tilting of the housing as might occur in a handheld instrument, for example, leaves the compensator undisturbed, so there is established an angular relationship between the objective and image plane with respect to the compensator, much in the same manner as if the compensator itself had been slightly rotated with the other elements held fixed. This situation, then, results in the same geometry as described in connection with FIGURE 2 wherein it may be considered that the effective mirroring plane 21 has been slightly tilted; and referring again to that figure, it is to be appreciated that light is reflected from the compensator at twice the angle of tilt. In order, then, for the image to be stabilized at the plane 54, such plane is displaced from the effective mirroring plane by a distance $f/2$ wherein $f$ is the focal length of the objective lens system. With twice the angle of deviation and one-half the focal length, there then results a translation of the image $(f/2)\,2\theta$ at the stabilized image plane 54 just sufficient to compensate for the small-angle motions of the housing carrying the objective and image plane which produces a translation error of $f\theta$. It is again noted that the motions referenced herein are those of "pitch" and "yaw" and do not encompass rotations of the optic axis. The majority of applications of accidental-motion compensators do not require compensation against "roll" motions.

With regard to the embodiment of the invention illustrated in FIGURE 6, it is noted that the pivot point 51 is shown to be located intermediate the objective and compensator; however, this pivot point may actually be located at a variety of different positions, such as, for example, those illustrated at 61 and 62, or intermediate positions, if desired. Inasmuch as this particular triple-reflection mirror system operates in such a manner as to apparently produce reflection from a plane mirror surface with translation, it is not particularly important where the pivot point is located; however, it is, of course, necessary to inertially stabilize the compensator about such pivot point. This particular feature of the present invention is highly advantageous in allowing a very substantial degree of freedom in physical structure of optical systems employing the accidental-motion compensator thereof. It is to be further noted that the stabilized image plane is displaced a distance $f/2$ from the effective mirroring surface 21, and that the location of this effective mirroring surface may be determined in accordance with the relationships set forth above. It is also to be noted that the path lengths of light within the compensator may be varied by changing the angle $\theta$ within the prescribed limits.

A large variety of embodiments of the present invention are possible, and numerous variations in structure are advantageous for particular applications. Thus, for example, it is advantageous in many instances to employ a gyroscope to assist in the inertial stabilization of the compensator. With a small gyroscope mounted, for example, in the position of the counterweight 53, it is possible to employ controllable precessing means to cause the compensator to follow housing movements beyond some limited predetermined angle. This is highly advantageous for optical instruments adapted to traverse during use, as in the panning of motion picture cameras, or the like. No attempt is made herein to describe appropriate gyroscopes or precessing means in detail, for such are known in the art; but it is noted that gyroscope precessing characteristics may be accurately tailored to particular applications by known precessing means. In addition to the utilization of gyroscopes for assisting inertial stabilization, it is also possible to employ other means, such as torquers driven from external sources, and other devices designed to minimize drift of purely inertial stabilization systems. No attempt is made herein to fully describe each and every possible stabilization means, for it is believed apparent that a wide variety of same is available in the art, and applicable to the present invention.

It will be seen from FIGURE 6 that light leaves the compensator in a direction back toward the objective but translated therefrom. While this is satisfactory for certain applications, it is generally considered unsatisfactory for optical-viewing devices. It is possible to improve this situation by the utilization of some type of reversing system which may even comprise an additional triple-reflecting element, or compensator, such as 44. An additional consideration in the present invention is the refractive effects of glass, or the like, as may be employed in a prism embodying the reflecting surfaces of the compensator hereof. The principal effect of a glass prism, for example, is a shift in the effective mirror plane, and this may be readily compensated for in the optic design. More specifically, the mirroring plane is brought closer to the front surface of the prism by the factor $x/n$ wherein $x$ is the original distance of the effective mirroring plane from the front surface of the prism, and $n$ is the index of refraction of the glass forming the prism.

It will be further appreciated that the image focused at the plane 54 has the incorrect parity for direct viewing; however, this may be readily remedied by the utilization of an additional three-reflection optical system disposed following the stabilization system. In actuality, the image can be rotated to any desired position by a proper choice of the post-stabilization optics. It is further possible to employ zoom optics or variable-magnification optical systems in the present invention acting on the stabilized image; however, it is not believed necessary herein to describe the intricacies of such systems further than to note that they are applicable herewith. While the present invention has been described above as comprised of three reflecting surfaces, it will, of course be appreciated that it is possible to employ five reflecting surfaces; however, such is generally not practical because of the added complexity and lack of improvement in the attainment of the objects hereof.

It is of particular note that the pivot point 51 may be located at substantially any desired position along the line midway between the optic axes entering and leaving the compensator 44; and, furthermore, that the perpendicular pivot axes need not intersect. Both pivots can actually be located at any convenient point along the line midway between the optic axes which give satisfactory optical performance under the particular conditions in which the present invention is employed.

It will be appreciated from the foregoing description of theory and representative examples that the present invention provides an improvement in accidental-motion compensation for optical instruments and devices. Although the invention has been described with respect to particular preferred embodiments, it is not intended to limit the invention to the exact terms or details of illustration employed. Reference is made to the following claims for a precise delineation of the true scope of the invention.

What is claimed is:

1. An image stabilizer comprising a housing, a focusing lens system mounted rigidly on the housing, an inertially stabilized reflecting element mounted to said housing positioned within said lens system, and a display plane positioned to receive light reflected from said reflective element, said reflecting element formed of at least three reflecting surfaces, said surfaces arranged in fixed angular relationship to each other so that the light beam from the objective lens is reflected from a first of the three surfaces to a second of the three surfaces and thence to the third of said three surfaces to the display plane, said three surfaces being further mutually arranged in fixed angular relation to each other to cause the light entering the first of the three surfaces to exit from the third of the three surfaces at a point transverse of the light entering the first of said three surfaces and at an angle wherein the angle deviation of the existing rays from the third of said reflecting surfaces is twice the angle of the incident ray entering the first of the three surfaces with respect to the axis of said reflecting element at which light entering will be parallel to light exiting.

References Cited

UNITED STATES PATENTS

| 2,906,161 | 9/1959 | Thompson | 350—50 X |
| 3,026,620 | 3/1962 | Rantsch. | |
| 1,628,777 | 5/1927 | Henderson. | |
| 1,639,229 | 8/1927 | Luckey. | |
| 2,571,937 | 10/1951 | Peck. | |
| 2,944,783 | 7/1960 | Macleish et al. | 350—16 X |
| 2,959,088 | 11/1960 | Rantsch | 350—16 X |
| 2,981,141 | 4/1961 | Armstrong et al. | |
| 3,158,674 | 11/1964 | Woodson. | |

FOREIGN PATENTS

| 146,960 | 1962 | Russia. |
| 869,617 | 5/1961 | Great Britain. |
| 1.386,114 | 12/1964 | France. |

DAVID SCHONBERG, Primary Examiner

P. R. GILLIAM, Assistant Examiner